Patented Apr. 16, 1946

2,398,494

UNITED STATES PATENT OFFICE 2,398,494

PREPARATION OF FLUORINE-CONTAINING ENAMELS

Alden J. Deyrup, Westfield, N. J., assignor to E. I. du Pont de Nemours & Company, Wilmington, Del., a corporation of Delaware No Drawing. Application October 4, 1943, Serial No. 504,890

4 Claims. (Cl. 106—48)

This invention relates to new and improved low-melting glaze compositions or enamels, and to a new and improved method of producing these vitreous compositions. More particularly, it relates to low-melting enamels or glazes suitable for application to glassware or ceramic articles, being more especially directed to the preparation of enamels of this type containing fluorine or metallic fluorides.

In my copending application Serial No. 421,245, filed December 1, 1941, now Patent No. 2,338,099, I have disclosed certain new and improved low-melting vitreous enamel compositions, suitable for application to glassware and other ceramic surfaces, which enamels are characterized by the presence therein of fluorine or metallic fluorides. These compositions, which normally contain other constituents such as lead oxide, silica, and zirconium dioxide, are of unusually high alkali-resistance, being utilized commercially for the decoration of glassware such as milk and beverage bottles. When used for this purpose these enamels provide a permanent decoration or label for the bottle or glassware, this decoration possessing a hard vitreous glossy surface when fired in the usual manner through a lehr. While the resulting surface is glossy, unfortunately in many cases it cannot be made as smooth as desired by fusion in the decorating lehr because of the danger of deforming the ware during the process.

I have now found that enamel compositions containing fluorine or fluorides can be substantially improved in the degree of gloss obtainable by firing at temperatures within specified ranges by the use, in the preparation of the coarse frit, of a novel heating step. This procedure, which is particularly applicable to the glasses described in my above-identified copending application but which gives good results when applied to other glaze compositions containing fluorine or fluorides, involves preparing the coarse frit in the usual manner by melting the batch and pouring it into water or other suitable liquid, and then subsequently baking or heating the coarse frit at a temperature within the annealing range of the vitreous enamel. By the annealing range I mean that range of temperatures extending from those relatively lower elevated temperatures at which strains in the vitreous composition relieve themselves at a measurable rate, to those relatively higher temperatures at which the glass softens and deforms readily. After this baking or heating step the frit is cooled, either rapidly or slowly as desired, and then processed in the usual manner, as by admixing with it a ceramic pigment or opacifier, followed by comminution to a fine powder by grinding. The resulting enamel is one which can then be utilized in the customary manner to yield a decorative surface characterized by considerable improvement in gloss or smoothness.

It is, accordingly, one of the objects of this invention to render available for use in the preparation of vitreous enamels or glazes containing fluorine or fluorides a procedure which will result in a product giving superior gloss and smoothness when applied in the usual manner and matured on glass or ceramic ware. It is another object of this invention to secure the desired improvement in gloss or smoothness, when the enamel composition is matured on the article to be decorated, by treatment of the coarse frit by heating it at a temperature within the annealing range. These and still other objects of this invention will be apparent from the ensuing disclosure of certain preferred embodiments thereof.

In practicing my invention I have found that the particular temperature selected for baking or heating the coarse fritted enamel is not critical, as long as it is within the annealing range of the vitreous composition. I prefer to utilize a temperature which is below that at which the frit commences to soften and stick together, this temperature being, in general, one which is below 450° C. to 500° C. It is desirable to hold the vitreous composition at this temperature long enough to acquire uniformity of temperature, a period of at least one hour being generally preferred. The step of baking or heating the vitreous composition to a temperature within the annealing range is, I have found, necessarily carried out before the fritted enamel is ground in the usual manner to a fine powder.

My procedure is applicable, and will result in substantially improved gloss regardless of the particular enamel composition selected, as long as those enamels are characterized by containing fluorine, frequently expressed as such in giving the composition of the vitreous enamel, and also frequently expressed as present in the form of one or more metallic fluorides. As illustrative of such an enamel, flux 3 of Table III of my copending application, Serial No. 421,245, filed December 1, 1941, may be selected. This vitreous enamel composition had the following constituents, present in the amounts noted:

| | Per cent |
|---|---|
| Lead oxide—PbO | 42.4 |
| Silica—SiO$_2$ | 26.3 |
| Zirconium dioxide—ZiO$_2$ | 8.8 |
| Sodium fluoride—NaF | 5.8 |
| Sodium oxide—Na$_2$O | 3.0 |
| Boric oxide—B$_2$O$_3$ | 7.3 |
| Titanium dioxide—TiO$_2$ | 3.2 |
| Cadmium oxide—CdO | 3.2 |

All percentages are by weight, based on the total weight of the enamel.

In preparing this enamel, treated in accordance with my novel heating step, the vitreous composition was fritted, but not ground to a fine powder. Fritting can be readily carried out by pouring the molten vitreous composition into water, any other liquid, or in any other equivalent manner as well understood in the art of preparing enamels. The composition was then baked at a temperature of 480° C. for approximately one hour. For comparison purposes a sample of the same enamel composition, but one which had not been subjected after fritting to baking in accordance with my improved process, was selected.

In both cases 10% of titanium dioxide as opacifier was added as a mill addition to the coarse frit. The milled products were suspended in the same vehicle and applied to glassware articles being fired at a temperature of 580° C. in accordance with the usual practice. The product which had been subjected to baking at 480° C. for one hour, after fritting but before grinding, was found to be equal in alkali resistance and other desirable enamel properties to the enamel of the same composition which had not been baked or heated in accordance with my invention, but was also found to provide a coating of markedly superior gloss. The gloss or smoothness of the enamel prepared from the frit which had been baked at a temperature within the annealing range in accordance with my invention was very much more satisfactory than obtained with the same enamel composition, of identical composition, but prepared without baking or heating the frit at a temperature within the annealing range.

The reason for the improvement in gloss or smoothness produced by heating the coarse frit at a temperature within the annealing range is not clearly understood. Ordinarily, improvement in gloss is secured only by changing the stoichiometrical composition of the enamel, which frequently entails sacrifies in the chemical resistivity. I have now discovered a method by which this improvement in fluorine-bearing enamels can be secured without any change in stoichiometric composition, or sacrifice in resistivity of the enamel coating to the action of chemical agents, or other detrimental effect on the enamel. The improvement in gloss is evident only in enamels containing fluorine, this fluorine content being ordinarily expressed either by giving the percentage of fluorine, or expressing the fluorine content in the form of metal fluoride, and it is only glazes or enamels of this type which I term in the claims fluorine-containing enamels.

To those skilled in the art many modifications and widely different embodiments of my invention in the general field of decoration by means of vitreous compositions will be readily suggested. The disclosures and descriptions given herein are intended to be illustrative and not restrictive. As various changes may be made in the heating procedure, as long as the heating is carried out on the coarse fritted enamel product at a temperature within the annealing range, it is my intention that these changed procedures, so far as they are within the scope of the invention, shall be included within the purview of the appended claims.

I claim:

1. The process of improving the smoothness and gloss of a fluorine-containing enamel when fired and matured on an article to be coated or decorated, which comprises, fritting the said fluorine containing enamel, and then heating said coarse fritted enamel, before the same is ground to a size used in firing, to a temperature within its annealing range but below the temperature at which the particles soften and stick together for a period long enough to insure all portions of said fritted product reaching a temperature within said range.

2. The process of improving the smoothness and gloss of a fluorine-containing enamel when fired and matured on an article to be coated or decorated, which comprises, baking a coarse, unground, fritted fluorine-containing enamel at a temperature within its annealing range but below one at which said fritted product begins to soften and stick together.

3. The process of improving the smoothness and gloss of a fluorine-containing enamel when fired and matured on an article to be coated or decorated, which comprises, heating a coarse, unground, fritted fluorine-containing enamel for a period of at least one hour to a temperature within the range 400 to 580° C.

4. The improved vitreous enamel frit prepared in accordance with the process defined in claim 1.

ALDEN J. DEYRUP

Certificate of Correction

Patent No. 2,398,494.

April 16, 1946.

ALDEN J. DEYRUP

It is hereby certified that error appears in the printed specification of the above numbered patent requiring correction as follows: Page 2, second column, line 56, claim 3, for "580° C." read *550° C.*; and that the said Letters Patent should be read with this correction therein that the same may conform to the record of the case in the Patent Office.

Signed and sealed this 2d day of July, A. D. 1946.

[SEAL]

LESLIE FRAZER,
*First Assistant Commissioner of Patents.*